(12) United States Patent
Chen et al.

(10) Patent No.: US 11,442,432 B2
(45) Date of Patent: Sep. 13, 2022

(54) COMMUNICATION DEVICE AND METHOD FOR DATA TRANSMISSION WITHIN AN INDUSTRIAL COMMUNICATION NETWORK

(71) Applicant: Siemens Aktiengesellschaft, Munich (DE)

(72) Inventors: Feng Chen, Feucht (DE); Franz-Josef Götz, Heideck (DE); Marcel Kießling, Bayern (DE); An Ninh Nguyen, Nuremberg (DE); Jürgen Schmitt, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/279,295

(22) PCT Filed: Aug. 23, 2019

(86) PCT No.: PCT/EP2019/072579
§ 371 (c)(1),
(2) Date: Mar. 24, 2021

(87) PCT Pub. No.: WO2020/064237
PCT Pub. Date: Apr. 2, 2020

(65) Prior Publication Data
US 2022/0050440 A1  Feb. 17, 2022

(30) Foreign Application Priority Data

Sep. 25, 2018 (EP) .................................. 18196595

(51) Int. Cl.
*G05B 19/418* (2006.01)

(52) U.S. Cl.
CPC ..... *G05B 19/4185* (2013.01); *G05B 19/4188* (2013.01); *G05B 19/41875* (2013.01)

(58) Field of Classification Search
None
See application file for complete search history.

(56) References Cited

U.S. PATENT DOCUMENTS 10,298,380 B2   5/2019 Kiessling
11,140,362 B2 * 10/2021 Michel ................. H04N 21/858
(Continued)

FOREIGN PATENT DOCUMENTS

| DE | 10138363 | 2/2003 |
|----|----------|--------|
| EP | 3038325  | 6/2016 |
| WO | 2019007516 | 1/2019 |

OTHER PUBLICATIONS

Nasrallah Ahmed et al. "Ultra-Low Latency (ULL) Networks: The IEEE TSN and IETF DetNet Standards and Related 5G ULL Research", IEEE communications Surveys & Tutorials, pp. 1-1, section A; pp. 1; section A; pp. 45, right column; 2018.

(Continued)

*Primary Examiner* — Philip Wang
(74) *Attorney, Agent, or Firm* — Cozen O'Connor

(57) ABSTRACT

Method for data transmission within an industrial communication network, wherein selected datagrams are transmitted within predetermined time intervals, which are synchronized at all network nodes, where a number of network nodes from the respective source network node to the respective target network node is determined for forwarding the selected datagrams in each case, and where the selected datagrams are transmitted during first periodic time intervals having a first protection interval length in the event of a determined number of network nodes corresponding to at least one predefined threshold value and, in contrast thereto, if a determined number lies below the threshold value, then (Continued)

the selected datagrams are transmitted during second periodic time intervals having a second protection interval length, which is shorter than the first protection interval length.

16 Claims, 3 Drawing Sheets

(56) References Cited

U.S. PATENT DOCUMENTS

| | | |
|---|---|---|
| 11,240,176 B2* | 2/2022 | Zhao ................... H04L 47/826 |
| 2017/0085483 A1* | 3/2017 | Mihály ................... H04L 47/11 |
| 2017/0155497 A1* | 6/2017 | Barrenscheen ....... H04L 7/0087 |
| 2019/0045003 A1* | 2/2019 | Archer ................ H04L 67/2828 |
| 2019/0110277 A1* | 4/2019 | Bhattad ................. H04L 1/0026 |
| 2019/0289616 A1* | 9/2019 | Hampel ............ H04W 28/0268 |
| 2022/0124736 A1* | 4/2022 | Huang .................. H04W 72/14 |

OTHER PUBLICATIONS

PCT International Search Report dated Nov. 20, 2019 based on PCT/EP2019/072579 filed Aug. 23, 2019.

* cited by examiner

COMMUNICATION DEVICE AND METHOD FOR DATA TRANSMISSION WITHIN AN INDUSTRIAL COMMUNICATION NETWORK

CROSS-REFERENCE TO RELATED APPLICATIONS

This is a U.S. national stage of application No. PCT/EP2019/072579 filed 23 Aug. 2019. Priority is claimed on European Application No. 18196595.5 filed 25 Sep. 2018, the content of which is incorporated herein by reference in its entirety.

BACKGROUND OF THE INVENTION

1. Field of the Invention

The present invention relates to industrial communication networks and systems and, more particularly, to a communication device and a method for data transmission within an industrial communication network.

2. Field of the Invention

An industrial automation system normally comprises a multiplicity of automation devices networked to one another via an industrial communication network and is used for controlling or regulating installations, machines or devices within the context of a production or process automation. Time-critical constraints in industrial automation systems mean that predominantly realtime communication protocols, such as PROFINET, PROFIBUS, realtime Ethernet or time-sensitive networking (TSN), are used for communication between automation devices.

Interruptions to communication connections between computer units of an industrial automation system or automation devices can lead to undesirable or unnecessary repetition of a transmission of a service request. Additionally, messages that are not transmitted or incompletely transmitted can prevent an industrial automation system from changing to or remaining in a safe operating state, for example. This can finally lead to failure of a complete production installation and to costly production downtime. One particular problem area in industrial automation systems regularly results from message traffic that contains relatively many but relatively short messages, which intensifies the above problems.

Use for often extremely different applications can create problems in Ethernet-based communication networks, for example, if network resources are used for transmitting multicast data streams or data frames with realtime demands in competition with transmitting data frames having a large payload content without specific quality of service demands. This can lead to multicast data streams or data frames with realtime demands not being transmitted in accordance with a demanded or required quality of service.

Prioritized transmission of data frames is fundamentally possible, for example on the basis of virtual local area networks (VLANs) in accordance with Institute of Electrical and Electronics Engineers (IEEE) standard 802.1Q, via appropriate tags inserted in data frames. For the purpose of synchronized and prioritized transfer of audio and video data streams (audio/video bridging) via communication networks, there is provision in accordance with IEEE standard 802.1Qav for bandwidth reservation for individual communication connections that have a highest assigned priority. Resources required for transferring audio and video data streams are reserved in communication devices, such as switches, in this case. However, high-priority data frames are forwarded only after a successful reservation. Bandwidth monitoring is used to ensure that there is sufficient reserved bandwidth available with regard to bandwidth that is actually used. A communication connection that uses more bandwidth than is reserved would otherwise lead to a disturbance on an entire communication network, in the worst case, to the communication network being halted on account of overload.

For the secure transfer of audio and video data streams via Ethernet-based communication networks, credit-based shapers (CBSs) have been defined in accordance with IEEE standard 802.1Qbv as a measure of bandwidth monitoring. Credit-based shapers define a transfer pause after each transferred data frame to ensure bandwidth limiting with reference to a reserved bandwidth. However, such enforced pauses are extremely problematic in industrial automation systems when transferring many data frames having little payload content for control data, which are more likely to be regarded as data bundles or bursts.

DE 10 138 363 A1 discloses a method for ensuring the quality of service of Internet applications in which Internet applications are automatically adapted and optimized by making use of the resources of the IP access network and the end system that are available at the starting time of the Internet application. Internet applications detect the Quality of Service (QoS) communication demands on the IP access network and store them as application profiles. When an Internet application is activated, the currently available network resources of the IP access network are compared with the stored application profiles, and control data are ascertained. The ascertained control data are used to optimize the provision of the network resources for the relevant Internet application. This optimization relates to an adapted timing and the ascertainment of the most favorable circumstances from the point of view of costs (transfer costs).

In accordance with EP 3 038 325 A1, data transmission in a communication network of an industrial automation system is accomplished by virtue of coupling communication devices of the communication network transmitting first data frames comprising control data for the automation system only within periodic first time intervals. Second data frames assigned to data streams comprising sequences of data frames, or third data frames, for the transmission of which there is no stipulated quality of service or a stipulated quality of service below a predefined threshold value, are transmitted within periodic second time intervals. The first time intervals are divided into first and second subintervals. First data frames to be forwarded are added to a first or second queue in alternate subintervals and alternately taken from the queues for forwarding.

International patent application PCT/EP2017/066989 (WO 2019/007516) describes a method for data transmission that involves selected datagrams being transmitted within an automation network preferably and at regular time intervals. The selected datagrams are each transmitted from a data sender to a data receiver at least via a first switching node and via a second switching node. A time window, in particular a TDMA time window, the beginning of which is time-synchronized in all switching nodes, is exclusively reserved for transmitting the selected datagrams between the first switching node and the second switching node in each case. The exclusively reserved time window comprises a latency-dependent guard interval, the length of which is proportioned in accordance with the latency along the longest path within the automation network. For data streams that are transmitted via relatively short parts in comparison with the longest path, the guard interval can sometimes have unnecessarily long proportions, which means that fundamentally available resources are not used efficiently for data transmission.

SUMMARY OF THE INVENTION

In view of the foregoing, it is therefore and objection of the present invention to provide an apparatus and efficient method for data transmission in particular within an industrial automation network that allows prioritized transmission of selected datagrams while taking into consideration requisite guard intervals.

This and other objects and advantages are achieved in accordance with the invention by a communication device and method via which selected datagrams are transmitted from first communication devices, or source network nodes, to second communication devices, or destination network nodes, within predefined time intervals. The predefined time intervals are synchronized at all network nodes. The first communication devices are preferably connected to the second communication devices via a time-sensitive network, in particular in accordance with the IEEE 802.1Q and IEEE 802.1Qbv standards.

In accordance with the invention, a number of network nodes from the respective first communication device, or source network node, to the respective second communication device, or destination network node, is ascertained for forwarding the selected datagrams in each case. The selected datagrams are transmitted during first periodic time intervals having a first guard interval length if the ascertained number of network nodes corresponds to at least one predefined threshold value. By contrast, the selected datagrams are transmitted during second periodic time intervals having a second guard interval length, which is shorter than the first guard interval length, if the ascertained number is below the threshold value. The first guard interval length and the second guard interval length are preferably stipulated based on ascertained latencies for a transmission of the selected datagrams from the first communication devices, or source network nodes, to the second communication devices, or destination network nodes. This makes it possible for communication networks with few connections that have a larger number of hops to have a resource allocation model implemented for them that allows efficient transmission of data streams via connections that have only a relatively small number of hops. The reason is that a shortened guard interval can be provided for the latter connections, as a result of which it is possible for hitherto essentially unused system resources to be allocated elsewhere.

In accordance with an advantageous embodiment of the present invention, the selected datagrams are assigned to a first category or class, for the transmission of which first system resources are reserved within the communication network, if the ascertained number of network nodes corresponds to at least the predefined threshold value. By contrast, the selected datagrams are assigned to a second category or class, for the transmission of which second system resources are reserved within the communication network, if the ascertained number is below the threshold value. Preferably, category-specific time-aware shapers according to IEEE 802.1Qbv are each used for selected datagrams of the first category and for selected datagrams of the second category. In particular, there can be provision for a pause time window between the first time intervals and the second time intervals in each case.

In accordance with a particularly preferred embodiment of the present invention, the selected datagrams are transmitted as multicast data streams via paths comprising intermediate network nodes. Communication terminals connected to the first communication devices specify quality of service parameters for each multicast data stream of multicast data streams to reserve resources to be provided to intermediate network nodes by third communication devices. On this basis, communication terminals connected to the second communication devices each specify a multicast data stream identifier for a reservation request. The communication terminals connected to first communication devices, or source network nodes, can each have an assigned talker function, for example, while the communication terminals connected to second communication devices, or destination network nodes, can each have an assigned listener function.

Furthermore, in the event of a reservation request the third communication devices or a superordinate control device advantageously check or checks in each case whether there are sufficient resources available in the third communication devices along the respective path for the purpose of data transmission while maintaining the specified quality of service parameters. If there are sufficient resources, then a multicast address assigned to the each specified multicast data stream identifier is preferably transmitted to a requesting communication terminal connected to a destination network node. The resources to be provided by the third communication devices can comprise in particular bandwidth, number of queues, queue cache or address cache of the respective third communication device. The reserve requests are preferably handled in accordance with the IEEE 802.1Qcc standard.

The communication device in accordance with the invention is suitable for performing the method in accordance with the above-disclosed embodiments of the method in accordance with the invention and comprises multiple connections for connection to further communication devices and also a coupling element via which the connections are switchably connectable to one another. The communication device is configured to transmit selected datagrams from first communication devices, or source network nodes, to second communication devices, or destination network nodes, within predefined time intervals and to synchronize the predefined time intervals with communication devices at other network nodes.

Furthermore, the communication device in accordance with the invention is configured to ascertain a number of network nodes from the respective first communication device, or source network node, to the respective second communication device, or destination network node, for forwarding the each of the selected datagrams and to transmit the selected datagrams during first periodic time intervals having a first guard interval length if the ascertained number of network nodes corresponds to at least one predefined threshold value. Additionally, the communication device is configured to transmit the selected datagrams during second periodic time intervals having a second guard interval length, which is shorter than the first guard interval length, if the ascertained number is below the threshold value.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
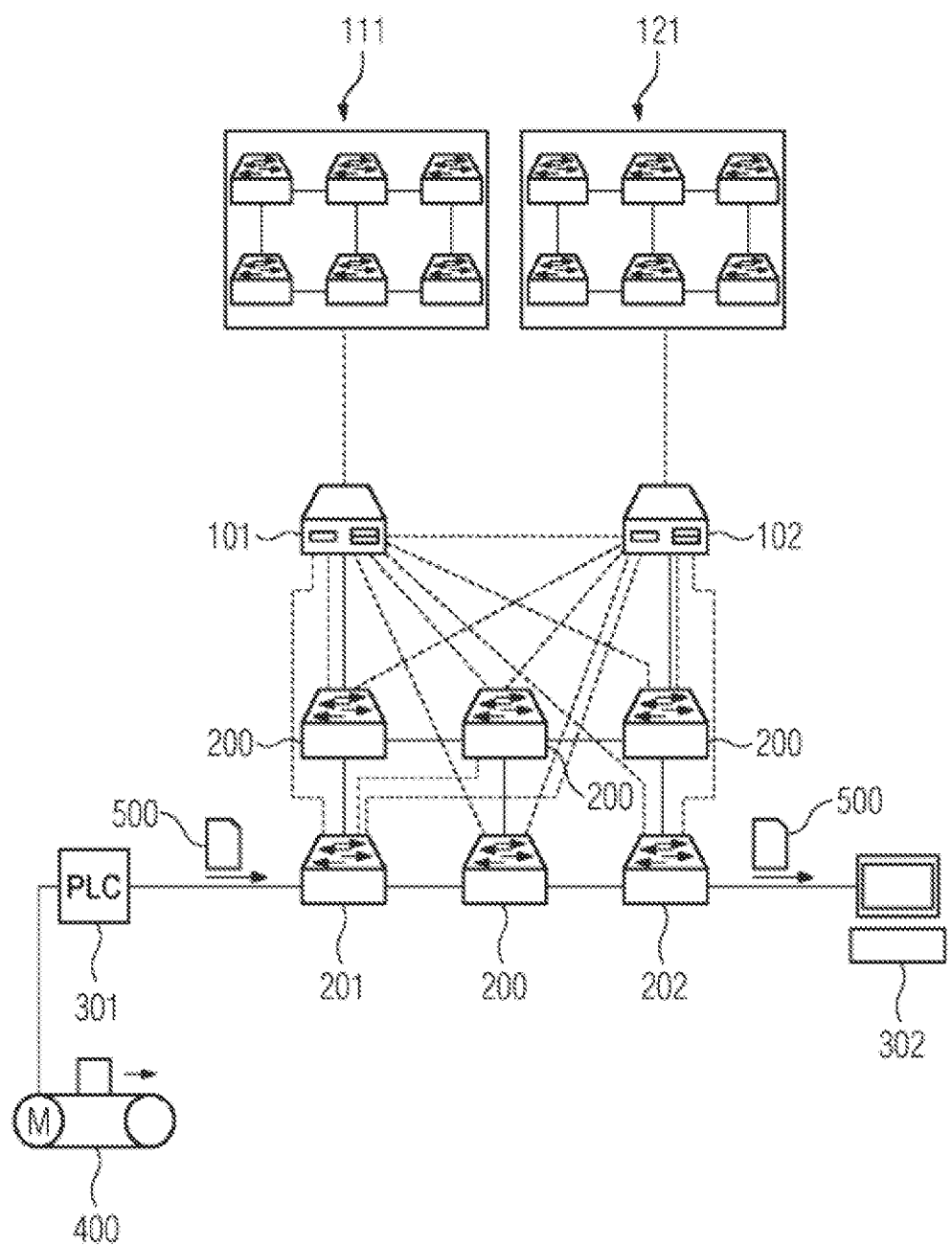
FIG. 1 shows a communication network, comprising multiple communication devices, of an industrial automation system in accordance with the invention.

The communication network of an industrial automation system depicted in FIG. 1 comprises multiple communication devices 200-202 and superordinate control units 101, 102. The communication devices 200, 201, 202 can be bridges, switches and routers, for example, and used for connecting programmable logic controllers 301, input/output units (I/O modules) or operating and observation stations 302 of the industrial automation system. In the present exemplary embodiment, the communication network comprising the communication devices 200, 201, 202 is configured as a time-sensitive network 200 in accordance with the IEEE 802.1Q and IEEE 802.1Qbv standards.

Programmable logic controllers 301 typically each comprise a communication module, a central unit and at least one input/output unit. Input/output units can fundamentally also be configured as local peripheral modules that are arranged remotely from a programmable logic controller. The communication module connects a programmable logic controller 301, for example, to a switch or router or additionally to a field bus. The input/output unit is used for interchanging control and measured variables between the programmable logic controller 301 and a machine or apparatus 400 controlled by the programmable logic controller 301. The central processing unit is provided in particular for ascertaining suitable control variables from captured measured variables. The above components of the programmable logic controller 301 are connected to one another via a backplane bus system in the present exemplary embodiment.

An operating and observation station 302 is used for visually displaying process data or measured and control variables that are processed or captured by programmable logic controllers, input/output units or sensors. In particular, an operating and observation station 302 is used for displaying values of a control loop and for altering control parameters. Operating and observation stations 302 comprise at least a graphical user interface, an input device, a processor unit and a communication module.

In the present exemplary embodiment, the communication devices 200, 201, 202 have an assigned superordinate optional control device that comprises a main control unit 101 and a reserve control unit 102. The main control unit 101 and the reserve control unit 102 are redundant with respect to one another. In particular, the main control unit 101 undertakes a master role, while the reserve control unit 102 has an assigned slave role. The control units 101, 102 preferably authenticate themselves to the assigned communication devices 200, 201, 202 and, following successful authentication, are provided with control access to the assigned communication devices 200, 201, 202. For each control unit 101, 102 there is provision for a respective separate resource view 111, 121 of the communication devices 200, 201, 202.

First automation devices, which comprise communication terminals representing source network nodes and have a talker function, are used to provide information or services via multicast data streams for use on second automation devices, which comprise communication terminals representing destination network nodes and have a listener function. An automation device can have both a talker function and a listener function at the same time, for example, if it firstly provides automation services and secondly uses automation services of other devices.

Figure 2:
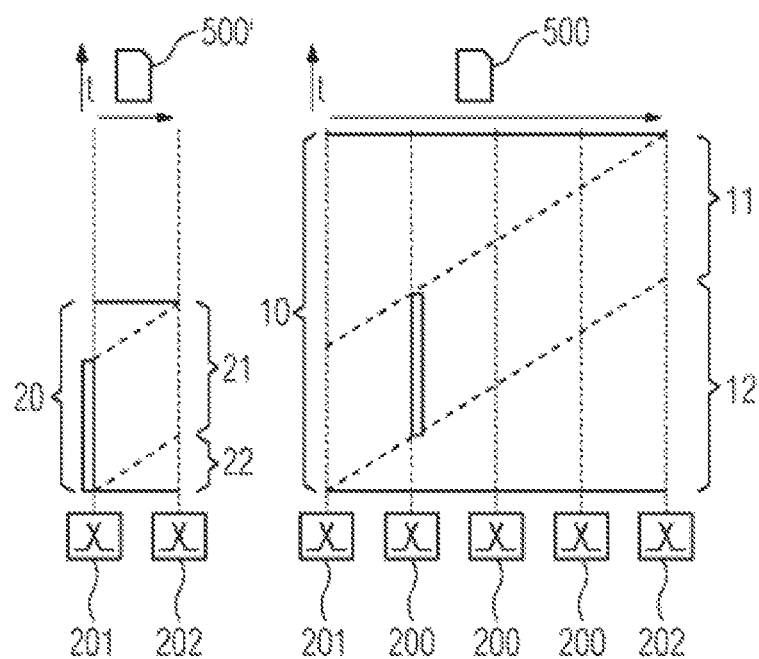
FIG. 2 shows a schematic depiction of time intervals for transmitting data streams via few or many network nodes in accordance with the invention.

In the present exemplary embodiment, the programmable logic controller 301 has a talker function, while the operating and observation station 302 has a listener function and particularly receives information provided by the programmable logic controller 301. Fundamentally, the operating and observation station 302 could analyze information received from the programmable logic controller 301 and predefine control parameters for the programmable logic controller 301 therefrom. Both the programmable logic controller 301 and the operating and observation station would therefore perform both functions. To simplify presentation, it is assumed subsequently that both devices each have only one assigned function.

with reference to FIG. 2, in the present exemplary embodiment, selected datagrams 500, 500' are transmitted as multicast data streams from first communication devices 201, or source network nodes, to second communication devices 202, or destination network nodes, via third communication devices 200 at intermediate network nodes within predefined time intervals 10, 20. The predefined time intervals 10, 20 are synchronized at all network nodes. A number of network nodes from each respective source network node to each respective destination network node is ascertained for forwarding the selected datagrams 500, 500'. The selected datagrams 500, 500' are transmitted during first periodic time intervals 10 having a first guard interval length 12 if the ascertained number of network nodes corresponds to at least one predefined threshold value. By contrast, the selected datagrams 500, 500' are transmitted during second periodic time intervals 20 having a second guard interval length 22, which is shorter than the first guard interval length 12, if the ascertained number is below the threshold value.

The first guard interval length 12 and the second guard interval length 22 are stipulated based on ascertained latencies for a transmission of the selected datagrams 500, 500' from the source network nodes to the destination network nodes. These latencies 12, 22 comprise delays on links between network nodes and in bridges, switches or routers and reduce a usable bandwidth 11, 21 within the first or second time intervals. For presentation purposes, the latencies 12, 22 in FIG. 2 are portrayed significantly greater in comparison with the respectively usable bandwidth 11, 21 than is actually the case. The latencies 12, 22 certainly increase substantially proportionally from a qualitative point of view as the number of network nodes rises. Furthermore, the latencies in bridges or switches with "store and forward" mode of operation are dependent on a respective data frame length (frame size).

The selected datagrams 500, 500' are assigned to a first category, or data stream class, for the transmission of which first system resources are reserved within the communication network, if the ascertained number of network nodes corresponds to at least the predefined threshold value. By contrast, the selected datagrams 500, 500' are assigned to a second category, for the transmission of which second system resources are reserved within the communication network, if the ascertained number is below the threshold value. Preferably, category-specific time-aware shapers in accordance with the IEEE 802.1Qbv standard are each used for selected datagrams 500 of the first data stream class and for selected datagrams 500' of the second data stream class.

Figure 3:
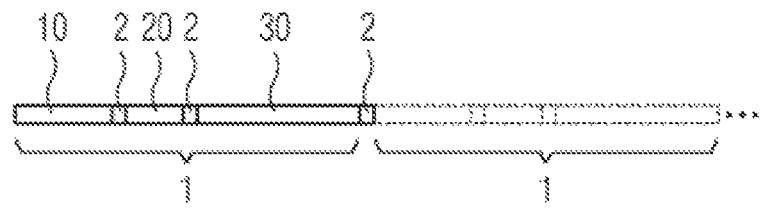
FIG. 3 shows a schematic depiction of an overall time frame for periodically transmitting data streams and other data traffic in accordance with the invention.

With reference to FIG. 3, within an overall time frame 1 for a periodic transmission of data streams and other data traffic, in particular best-effort data traffic without quality of service guarantees, there can be provision for a pause time window 2 between the first time intervals 10 and the second time intervals in each case. A corresponding pause time window 2 is preferably also realized between two successive overall time frames 1.

Communication terminals 301 connected to the first communication devices 201 preferably specify quality of service parameters in each case in order to reserve resources to be provided to intermediate network nodes for multicast data streams by third communication devices 200. Communication terminals 302 connected to the second communication devices 202 specify a multicast data stream identifier for a reservation request in each case. In the event of a reservation request, the third communication devices 200 or the superordinate control device 101, 102 check/checks in each case whether there are sufficient resources available in the third communication devices 200 along the respective path for the purpose of data transmission while maintaining the specified quality of service parameters. The resources to be provided, or that are provided, by the third communication devices 200 comprise, for example, bandwidth, number of queues, queue cache or address cache of the respective third communication device. If there are sufficient resources then a multicast address assigned to each specified multicast data stream identifier is transmitted to a requesting communication terminal connected to a destination network node. In the present exemplary embodiment, the reservation requests are handled in accordance with the IEEE 802.1Qcc standard.

A data-stream-specific and classification-relevant number of network nodes can be indicated and accordingly ascertained, for example, as a hop count by an Accumulated Latency field of a Talker Advertise message or by a specific TLV-encoded (Type-Length-Value) message attribute. Much better bandwidth utilization can be achieved by a check on the hop count and a limit for a forwarding of Talker Advertise messages in accordance with a maximum number of network nodes for the respective data stream class. The limit for the forwarding of Talker Advertise messages means that no listeners can register on a data stream if the transmission path in the network is too long for the consideration of resources. By allowing for a smaller latency-dependent component for time windows for data stream transmission it is possible either for significantly more data streams, particularly with a larger realtime data volume, to be reserved or for the time windows to be reduced. Smaller time windows are useful when multiple time windows, particularly for different classes of data traffic, are used in a communication network, in order to be able to provide multiple class-specific time windows.

Figure 4:
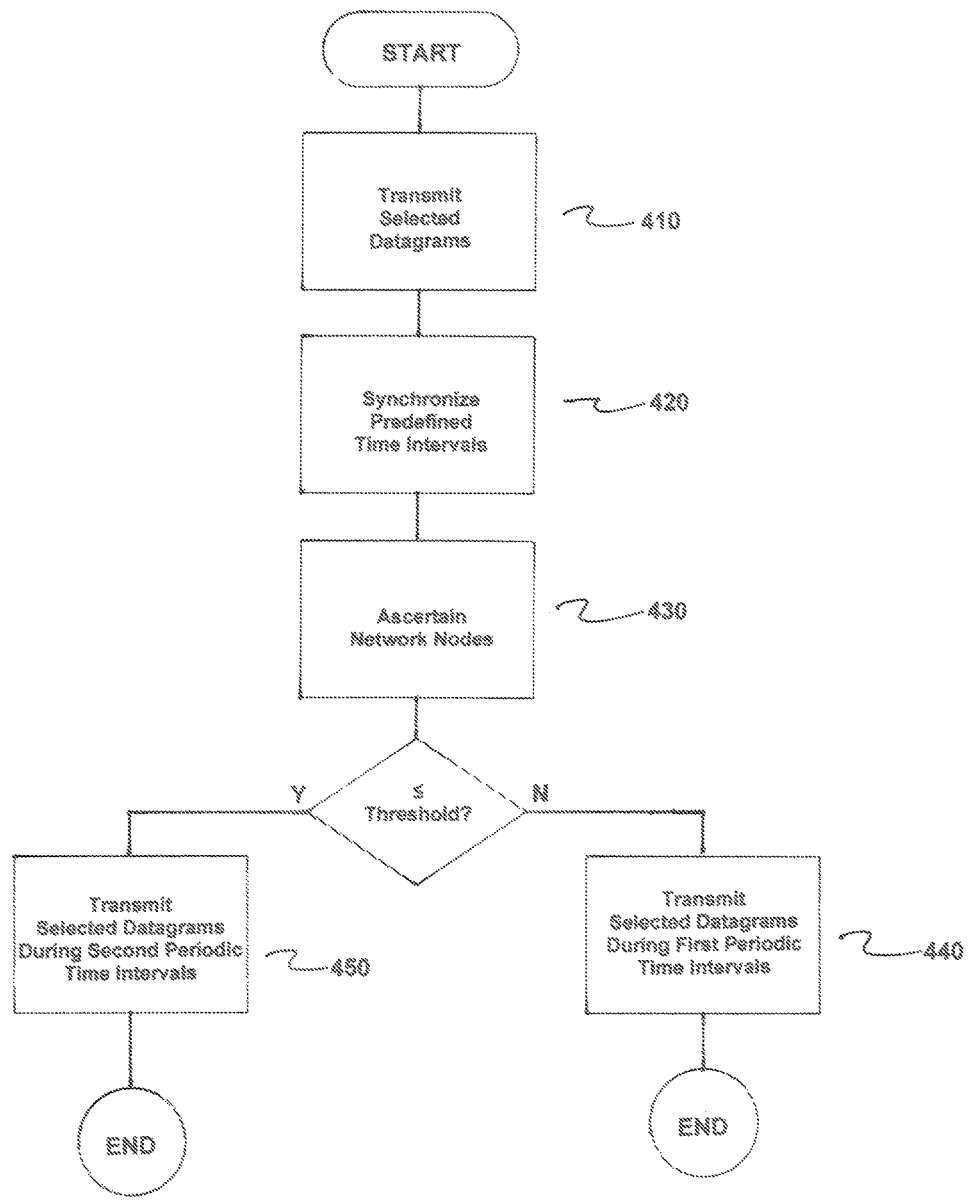
FIG. 4 is a flowchart of the method in accordance with the invention.

FIG. 4 is a flowchart of a method for data transmission within an industrial communication network. The method comprises transmitting selected datagrams 500, 500' from first communication devices 201 to second communication devices 202 within predefined time intervals 10, 20, as indicated in step 410.

Next, the predefined time intervals 10, 20 are synchronized at all network nodes, as indicated in step 420.

Next, a number of network nodes from each respective first communication device to each respective second communication device is ascertained for forwarding the selected datagrams 500, 500', as indicated in step 430.

Next, the selected datagrams 500, 500' are transmitted during first periodic time intervals 10 having a first guard interval length 12 if the ascertained number of network nodes corresponds to at least one predefined threshold value, as indicated in step 440.

Next, the selected datagrams 500, 500' are transmitted during second periodic time intervals 20 having a second guard interval length 22, which is shorter than the first guard interval length, if the ascertained number is below the threshold value, as indicated in step 450.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data transmission within an industrial communication network, comprising:
    transmitting selected datagrams from first communication devices to second communication devices within predefined time intervals;
    synchronizing the predefined time intervals at all network nodes;
    ascertaining a number of network nodes from each respective first communication device to each respective second communication device for forwarding the selected datagrams;
    transmitting the selected datagrams during first periodic time intervals having a first guard interval length if the ascertained number of network nodes corresponds to at least one predefined threshold value;
    transmitting the selected datagrams during second periodic time intervals having a second guard interval length, which is shorter than the first guard interval length, if the ascertained number is below the threshold value.

2. The method as claimed in claim 1, wherein the selected datagrams are assigned to a first category, for the transmission of which first system resources are reserved within the communication network, if the ascertained number of network nodes corresponds to at least the predefined threshold value; and
wherein the selected datagrams are assigned to a second category, for the transmission of which second system resources are reserved within the communication network, if the ascertained number is below the threshold value.

3. The method as claimed in claim 2, wherein category-specific time-aware shapers according to Institute of Electrical and Electronics Engineers (IEEE) standard 802.1Qbv are used in each case selected datagrams of the first category and for selected datagrams of the second category.

4. The method as claimed in claim 2, wherein a pause time window is provided between the first time intervals and the second time intervals in each case.

5. The method as claimed in claim 3, wherein a pause time window is provided between the first time intervals and the second time intervals in each case.

6. The method as claimed in claim 1, wherein the first communication devices are connected to the second communication devices via a time-sensitive network in accordance with Institute of Electrical and Electronics Engineers (IEEE) standard 802.1Q and IEEE standard 802.1Qbv.

7. The method as claimed in claim 1, wherein the selected datagrams are transmitted as multicast data streams via paths comprising intermediate network nodes, in which communication terminals connected to the first communication devices specify quality of service parameters for each multicast data stream of multicast data streams to reserve resources to be provided to intermediate network nodes by third communication devices;
wherein communication terminals connected to the second communication devices specify a multicast data stream identifier for a reservation request in each case; and
wherein in an the event of a reservation request at least one of (i) third communication devices and (ii) a superordinate control device each check/checks whether there are sufficient resources available in the third communication devices along a respective path to transmit data while maintaining the specified quality of service parameters.

8. The method as claimed in claim 7, wherein a multicast address assigned to each specified multicast data stream identifier is transmitted to a requesting communication terminal connected to a destination network node if sufficient resources are present.

9. The method as claimed in claim 7, wherein the resources to be provided by the third communication devices comprise at least one of (i) bandwidth, (ii) number of queues, (iii) queue cache and (iv) address cache of the respective third communication device.

10. The method as claimed in claim 8, wherein the resources to be provided by the third communication devices comprise at least one of (i) bandwidth, (ii) number of queues, (iii) queue cache and (iv) address cache of the respective third communication device.

11. The method as claimed in claim 7, wherein the reservation requests are handled in accordance with Institute of Electrical and Electronics Engineers (IEEE) standard 802.1Qcc.

12. The method as claimed in claim 8, wherein the reservation requests are handled in accordance with Institute of Electrical and Electronics Engineers (IEEE) standard 802.1Qcc.

13. The method as claimed in claim 9, wherein the reservation requests are handled in accordance with Institute of Electrical and Electronics Engineers (IEEE) standard 802.1Qcc.

14. The method as claimed in claim 11, wherein the communication terminals connected to first communication devices each have an assigned talker function; and wherein the communication terminals connected to second communication devices each have an assigned listener function.

15. The method as claimed in claim 1, wherein the first guard interval length and the second guard interval length are stipulated based on ascertained latencies for a transmission of the selected datagrams from the first communication devices to the second communication devices.

16. A communication device, comprising:
a plurality of multiple connections for connection to further communication devices;
a coupling element via which the plurality of multiple connections are switchably connectable to one another;
wherein the communication device is configured to:
transmit selected datagrams from first communication devices to second communication devices within predefined time intervals,
synchronize the predefined time intervals with communication devices at other network nodes,
ascertain a number of network nodes from each respective first communication device to each respective second communication device for forwarding the selected datagrams,
transmit the selected datagrams during first periodic time intervals having a first guard interval length if the ascertained number of network nodes corresponds to at least one predefined threshold value,
transmit the selected datagrams during second periodic time intervals having a second guard interval length, which is shorter than the first guard interval length, if the ascertained number is below the threshold value.

* * * * *